June 5, 1951     M. S. NEWMAN     2,555,600

PROCESS FOR PREPARATION OF VITAMIN A INTERMEDIATES

Filed May 10, 1947

```
┌─────────────────────────────────────┐
│ CONDENSE PROPARGYL ALCOHOL          │
│     WITH ALKOXY BUTANONE            │
└─────────────────────────────────────┘
                 │
            ┌─────────┐
            │HYDROLYZE│
            └─────────┘
                 │
```

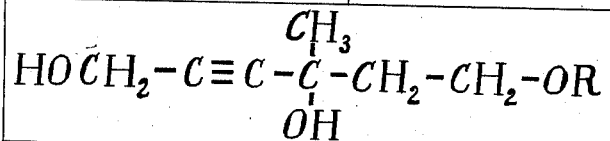

```
   ┌──────────────────┐      ┌──────────────────────┐
   │SELECTIVELY REDUCE│      │ SELECTIVELY DEHYDRATE│
   └──────────────────┘      │  selectively acylate │
              │              │  dehydrate           │
   ┌──────────────────────┐  │  alcoholize or hydrolize
   │ SELECTIVELY DEHYDRATE│  └──────────────────────┘
   │  selectively acylate │              │
   │  dehydrate           │      ┌──────────────────┐
   │  alcoholize or hydrolize    │SELECTIVELY REDUCE│
   └──────────────────────┘      └──────────────────┘
```

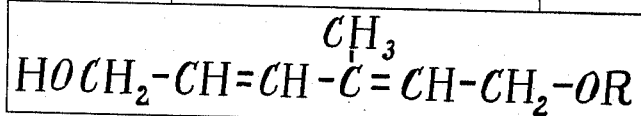

INVENTOR.
Melvin Spencer Newman
BY
Warren F. Schmidt,
HIS ATTORNEY

Patented June 5, 1951

2,555,600

UNITED STATES PATENT OFFICE 2,555,600

PROCESS FOR PREPARATION OF VITAMIN A INTERMEDIATE

Melvin S. Newman, Columbus, Ohio, assignor to Ohio State University Research Foundation, Columbus, Ohio, a corporation of Ohio Application May 10, 1947, Serial No. 747,180

14 Claims. (Cl. 260—615)

This invention relates to new processes for synthesizing compounds having the formula

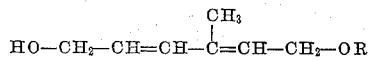

where R represents a lower alkyl radical having not more than six carbon atoms. It is illustrated by process of forming a 1-hydroxy-6-methoxy-4-methylhexadiene-2,4.

Such compounds may be used as intermediates in the formation of vitamin A ethers. For such uses I prefer to use compounds having an alkyl radical attached to the remainder of the molecule by oxygen where the alkyl radical has not more than four carbon atoms. Compounds having an alkyl group with more than four atoms but not more than six carbon atoms are operative and compounds having an alkyl group with more than six carbon atoms may be operative but in later manipulation in the synthesis of vitamin A ethers, the compounds involved may be more difficult to handle due to the higher temperature necessary and such compounds may have less vitamin A activity.

Prior to my discoveries, there has been no recognized method of preparing the above mentioned compounds. Nor had these materials been previously synthesized nor isolated. However, in applications Serial Nos. 747,176, 747,177, 747,178, and 747,179, I have disclosed portions of the process and processes forming the subject matter of this application and have disclosed the products formed by the processes to be covered by this application. In certain of those applications, such as for example application Serial No. 747,176, I have disclosed in detail most if not all of the processes to be covered hereby, but in none of those applications have I claimed the processes to be claimed herein.

One of the objects of my invention is the provision of new methods of synthesizing various intermediates and other chemicals.

A further object of this invention is the provision of new methods of synthesizing a 1-hydroxy-6-alkoxy-4-methylhexadienes-2,4.

A further object of this invention is the provision of new methods of synthesizing various intermediates involved in the processes of forming of such 1 - hydroxy - 6 - alkoxy - 4 - methylhexadienes-2,4.

A further object of the invention is the provision of new processes for selectively synthesizing intermediate products and compounds useful in the synthesis of 1-hydroxy-6-alkoxy-4-methylhexadienes-2,4.

Further objects and advantages of the present invention will be apparent from the following description, reference being had to the accompanying drawings wherein preferred forms of embodiments of the invention are clearly shown.

In the drawings:

The single figure illustrates methods of synthesizing the desired products.

In general, the processes disclosed herein relate to the synthesis of 1-hydroxy-6-alkoxy-4-methylhexadienes-2,4. One method comprises the condensation of propargyl alcohol with an alkoxy butanone to form a 6-alkoxy-4-methylhexyne-2-diol-1,4; the selective dehydration thereof to remove the hydroxyl group from the No. 4 carbon and to create a double bond adjacent thereto through the unsaturation of said carbon atom; and the subsequent reduction of the triple bond on the No. 2 carbon to a double bond. Another similar method comprises the reversal of these steps (i. e. the reduction of the hexyne to a hexene and the subsequent selective dehydration thereof to form the hexadiene). Thus I have found that the above specified diols formed from propargyl alcohol and an alkoxy butanone may be converted into the desired hydroxy alkoxy methylhexadienes by the two main steps of selective dehydration and reduction. Although I prefer to perform the reduction step first and the dehydration step subsequently, the order of these two steps is substantially immaterial and the words as used in this specification and later in the claims hereof "the steps of selectively reducing and selectively dehydrating" shall be construed to mean, unless the process is further limited by these words "in the order specified," the process involved in these two steps regardless of which step is performed first.

The preferred method of performing the process of selectively dehydrating certain intermediate compounds to form other intermediates or to form a 1-hydroxy-6-alkoxy-4-methylhexadiene-2,4 from a 6-alkoxy-4-methylhexene-2-diol-1,4, comprises the steps of acylating, dehydrating and alcoholizing or hydrolyzing in the order named.

In one preferred embodiment the 6-methoxy-4-methylhexyne-2-diol-1,4 is first reduced to form a 6-methoxy-4-methylhexene-2-diol-1,4. Thereafter it is selectively dehydrated by acylating, dehydrating, and alcoholizing or hydrolyzing in the order specified. By the acylation of the 6-methoxy-4-methylhexene-2-diol-1,4, the compound is converted into a 1-acyloxy-4-hydroxy-6-methoxy-4-methylhexene-2. By dehydration this compound becomes a 1-acyloxy-6-methoxy-4-methylhexadiene-2,4. By alcoholysis or hydrolysis the 1-hydroxy-6-methoxy-4-methylhexadiene-2,4 is obtained. In another embodiment of my invention a 6-methoxy-4-methylhexyne-2-diol-1,4 is first acylated, then dehydrated and alcoholized or hydrolyzed, and then reduced to form the 1-hydroxy-6-methoxy-4-methylhexadiene-2,4.

One method of condensing the propargyl alcohol with the alkoxybutanone comprises the reaction of an organo-metal derivative with propargyl alcohol to prepare a propargyl alcohol metal derivative, a metal atom replacing the hydrogen of the hydroxyl group and another replacing the acetylenic hydrogen. The metal derivative may then be reacted with an alkoxybutanone to give a metal complex addition product. The metal complex addition product is then hydrolyzed to give an alkoxy-methylhexyne-diol.

Where the alkoxymethylhexyne-diol is to be first selectively dehydrated, the 1-hydroxy group should first be protected. The preferred protecting group is the acetoxy group but other acyloxy groups or other types of protecting groups may be used if desired. For example the alkoxymethylhexyne-diol may be reacted with an organic acid, acid halide or acid anhydride to give an acyloxy-hydroxy-alkoxy-methylhexyne, which may then be treated with dehydrating agents to yield an acyloxyalkoxymethylhexeneyne. Thereafter the acyloxy group is removed by hydrolysis or alcoholysis. Then the hydroxyhexeneyne is selectively reduced to a hydroxy hexadiene.

Preferably, I first selectively reduce the alkoxy methylhexyne-diol and thereafter selectively dehydrate. In such case, I reduce the alkoxymethylhexynediol to the corresponding alkoxymethylhexene-diol. I then selectively dehydrate in any suitable manner. For the dehydration I prefer, however, to first block the hydroxyl group on carbon atom number one, by esterification as, for example, by acylation, in which case I obtain an acyloxyhydroxyalkoxymethylhexene. I then dehydrate selectively to produce an acyloxy-alkoxymethylhexadiene. The acyloxy group may then be removed by hydrolysis or alcoholysis to yield a hydroxyalkoxymethylhexadiene. It is important that the four steps of reduction, esterification, dehydration and alcoholysis or hydrolysis or the four steps of esterification, dehydration, alcoholysis or hydrolysis and reduction follow in one of the two orders above specified.

I have found that esters (especially acetates) of the propargyl type are cleaved by hydrogenolysis. The selective reduction step apparently cannot be satisfactorily accomplished while the compound has an acetyl (or other acyloxy) radical. I have found that the desired compound may be obtained if the propargyl diol is selectively dehydrated and reduced in either order. To selectively dehydrate, the three steps of esterification, dehydration and alcoholysis or hydrolysis in that specific order are preferred. The reduction can come before the three steps or after but should not be interposed.

Among the metals suitable for the formation of a carbon metal derivative of propargyl alcohol are magnesium and lithium as given in the above examples, other alkali metals such as sodium and potassium, alkaline earth metals such as calcium magnesium halide residue (—MgX); and other metals. The metal derivatives of propargyl alcohol are suitably made by reacting propargyl alcohol with a suitable organo-metal derivative which will exchange the acetylenic hydrogen. Suitable reagents for the preparation of the propargyl metal derivatives are the Grignard reagents (R'MgX) (where R' is a hydrocarbon radical) and metal alkyls (R'M) (where M may be any of the metals mentioned above). Thus although the preferred reagents are magnesium reagents and phenyl and butyl lithium, it should be understood that others are within the scope of this invention. The hydrogen of the alcohol is also exchanged for the metal in the same manner as the acetylenic hydrogen, but the oxygen-metal derivative so formed does not undergo the addition reactions as does the carbon-metal derivative. The metal attached to the carbon upon reaction with the butanone becomes an oxygen-metal group. Both oxygen-metal derivatives are converted to hydroxyl groups upon hydrolysis. These metalation reactions are preferably carried out in suitable solvents. For this purpose the solvent must be inert, (i. e. having no replaceable hydrogen or other reactive group) and must also be anhydrous. Ethers such as diethyl ether, dibutyl ether, and tetrahydrofurane and hydrocarbons such as pentane, hexane, benzene and toluene are among the solvents which are inert and can be obtained anhydrous. Diethyl ether or a mixture of diethyl ether and tetrahydrofurane are preferred solvents in which the reaction may be conducted.

The nature of the alkoxy group on the alkoxy butanone which is condensed with the metal derivative of propargyl alcohol determines the nature of the alkoxy group in the product of this invention. Thus R may be any hydrocarbon radical such as alkyl, cycloalkyl, aralkyl and aryl. In the preferred embodiment of this invention, R is a lower alkyl group such as one having four carbon atoms or less. Other hydrocarbon radicals are operative but in subsequent reactions the compound involved may be more difficult to handle due to higher boiling temperatures.

The hydrolysis of the addition complex resulting from the addition of the propargyl metal derivative and the ketone is preferably done with water. If desired, the reaction may be cooled during the hydrolysis. When water alone is used, metal hydroxides and basic metal salts may precipitate which may make isolation of the product difficult. The addition of small quantities of acids such as hydrochloric, sulfuric and acetic or small quantities of inorganic salts such as ammonium salts to the water used for hydrolysis is advantageous as it renders these precipitates water soluble or otherwise easily removed. The preferred embodiments of this invention provide for the use of such an agent during hydrolysis, but of such kind and in such amount that it will not react with any of the constituents of the reaction mixture in any way so as to lead to products other than those which are an object of this invention.

The esterification of the hydroxyl group on carbon atom number one of the alkoxy methylhexynediol is accomplished by an organic acid or acid derivative such as an acid halide or the acid anhydride which are equivalents for the esterification of the diol. Any organic acid or organic acid derivative may be used. However, for ease of manipulation in subsequent reactions, esters of lower molecular weight fatty acids are preferred.

The dehydration of a 1-acyloxy-4-hydroxy-6-alkoxy-4-methylhexyne-2 to a 1-acyloxy-6-alkoxy-4-methylhexene-4-yne-2 may be accomplished by heating with a suitable dehydrating agent, such as, for example, potassium acid sulfate or phenyl isocyanate or other isocyanates in a vacuum or in the absence of oxygen or in an inert atmosphere, the distillate being collected in fractions and used as such or fractionated again if desired.

The alcoholysis of a 1-acyloxy-6-alkoxy-4-methylhexene-4-yne-2 to a 1-hydroxy-6-alkoxy-4-methylhexene-4-yne-2, may be accomplished by heating with a metal alcoholate in an anhydrous alcohol solution and then isolating and purifying. Preferably the metal alcoholate is prepared from the same alcohol as is used as a solvent, the metal alcoholate serving as a catalyst to the reaction of the alcohol with the methylhexene-yne. For example, I may use corresponding sodium, calcium or aluminum alcoholates in methanol, ethanol, a propanol or a butanol.

Alternatively I may use alkaline earth, hydroxides or metallic hydroxides in aqueous alcoholic media to effect hydrolysis of the 1-acyloxy-6-alkoxy-4-methylhexene-4-yne-2 to a 1-hydroxy-6-alkoxy-4-methylhexene-4-yne-2.

The above steps consisting of alcoholysis and hydrolysis achieve the same result. Although the hydrolysis method is satisfactory yet so far as our research has gone the alcoholysis method seems preferable. Either step will achieve the result of "replacing the acyl (or acetyl) group by hydrogen" and where such language is used in this specification or in the claims it is intended to mean either a hydrolysis step or an alcoholysis step.

The reduction of the 1-hydroxy-6-alkoxy-4-methylhexene-4-yne-2 to the corresponding 4-methylhexadiene-2,4 may be accomplished either by a chemical reduction such as by solution in alcohol with a zinc copper alloy or by the use of hydrogen and a catalyst such as a supported palladium catalyst or a Raney iron catalyst.

The reduction of the alkoxymethylhexyne-diol to the corresponding alkoxymethylhexene-diol may also be accomplished either chemically (such as by solution in alcohol with a zinc copper alloy) or by the use of hydrogen and a catalyst such as a supported palladium catalyst or a Raney iron catalyst.

The esterification of the hydroxyl group on carbon atom number one of the alkoxy methylhexene-diol may be accomplished by treatment with an acid or acid derivative such as an acid halide or the acid anhydride. The corresponding ester of any organic acid is within the scope of this invention. However, for ease of manipulation in subsequent reactions, esters of lower molecular weight fatty acids are preferred. Thereby I may obtain a 1-acyloxy-4-hydroxy-6-alkoxy-4-methylhexene-2.

The dehydration of the 1-acyloxy-4-hydroxy-6-alkoxy-4-methylhexene-2 may be accomplished by heating with a suitable dehydrating agent such as, for example, potassium acid sulfate or phenyl isocyanate or other isocyanates in a vacuum, in the absence of oxygen, or in an inert atmosphere, the distillate being collected in fractions and used as such or fractionated again if desired.

The alcoholysis of the 1-acyloxy-6-alkoxy-4-methylhexadiene-2,4 to a 1-hydroxy-6-alkoxy-4-methylhexadiene-2,4 may be accomplished by heating with a metal alcoholate in an anhydrous alcohol solution and isolating and purifying. Preferably, the metal alcoholate is prepared from the same alcohol as is used as a solvent, the metal alcoholate serving as a catalyst. For example, I may use corresponding sodium, calcium or aluminum alcoholates in methanol, ethanol, a propanol or a butanol. Also I may hydrolyze the 1-acyloxy-6-alkoxy-4-methylhexadiene-2,4 to a 1-hydroxy-6-alkoxy-4-methylhexadiene-2,4 by the use of alkaline earth hydroxides or metallic hydroxides in aqueous alcoholic media.

In certain of the steps described, a caution has been given against the presence of oxygen. It is to be emphasized that the presence of oxygen should be avoided in all of the processes described.

The following examples are given in illustration of my invention:

EXAMPLE I

PREPARATION OF 6-METHOXY-4-METHYLHEXYNE-2-DIOL-1,4

A solution of 112 g. (2 moles) of propargyl alcohol in 400 cc. of dry ether was added dropwise over three hours to 2710 cc. of a stirred solution of 1.57 N (4.25 moles) butylmagnesium chloride in ether. The solution was stirred at room temperature for an additional hour and then a solution of 224 g. (2.2 moles) of 4-methoxybutanone-2 added over a period of two hours. After stirring overnight, the solution was hydrolyzed with 700 cc. of saturated ammonium chloride solution. The ether layer was separated, concentrated and the residue distilled under reduced pressure.

The product was obtained as a yellowish oil, B. P. 122–125° C. at 1 to 2 mm.; yield=132.5 g. (42%); $n_D^{20}=1.4744$.

Analysis:
    Calcd. for $C_8H_{14}O_3$: C, 60.7; H, 8.9.
    Found: C, 61.3, 61.2; H, 9.3, 9.1.

The product has the following structural formula:

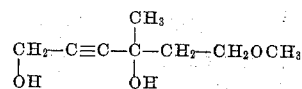

In addition, 37 g. (33% of propargyl alcohol) (B. P. 109–111° C.) was recovered from the low boiling fractions.

EXAMPLE II

PREPARATION OF 6-METHOXY-4-METHYLHEXENE-2-DIOL-1,4

In a typical experiment, 31.6 g. (0.2 mole) of 6-methoxy-4-methylhexyne-2-diol-1,4 in 100 cc. of absolute alcohol was reduced under low hydrogen pressure using 0.2 g. of a palladium on charcoal catalyst. The theoretical amount of hydrogen was taken up in four hours, and there was little noticeable reaction after this point. The catalyst was removed by filtration, the alsohol removed, and the residue then distilled at reduced pressure. The desired product, obtained in almost quantitative yield, distilled at 90–92° C. under 1 mm. pressure and had an index of refraction $n_D^{20}=1.4670$. The structural formula of the product was:

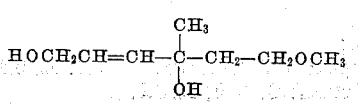

EXAMPLE III

PREPARATION OF "ENE-DIOL ACETATE"

*1-acetoxy-4-hydroxy-6-methoxy-4-methylhexene-2*

A 500 ml. three-necked flask, mounted in an ice bath, was equipped with a Hershberg type stirrer, rubber stopper in one side neck, and rubber stopper bearing a calcium chloride tube in the other side neck. In the flask was placed 41 ml. (0.44 mole, 44.4 g.) of acetic anhydride. To the cold acetic anhydride was added, with stirring 58 g. (0.36 mole) of "ene-diol" (6-methoxy-4-methylhexene-2-diol-1,4) dissolved in 87.4 ml. (1.09 mole, 85.8 g.) of anhydrous pyridine, freshly distilled from barium oxide.

Stirring was continued for twenty hours, during which period the ice melted, and the reaction proceeded at room temperature.

The solvents were then removed by distillation at 15 mm. During the distillation of the residue, illuminating gas was introduced into the Claisen flask through the capillary tube.

| Fraction | Vapor Temp. | Bath Temp. | Pressure | Weight | $n_D^{20}$ |
|---|---|---|---|---|---|
|  | Degree | Degree | Mm. | G. |  |
| 1 | 50–90.6 | 90–109 | 1.5 | 1.3 |  |
| 2 | 90.6–95 | 109–114 | 1.5 | 25.1 | 1.4533 |
| 3 | 95–98 | 114–117 | 1.5 | 25.7 | 1.4527 |
| 4 | 98–105 | 121–126 | 1.5 | 9.6 | 1.4528 |

Since there was little difference between the refractive indices of fractions 2, 3, and 4, they were combined to give a yield of 60.4 g., 82.6% of theoretical.

Analysis:
  Calcd. of $C_{10}H_{18}O_4$: C, 59.4; H, 9.0.
  Found: C, 59.7, 59.8; H, 9.0, 9.1.

The structural formula of the product is:

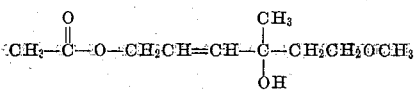

EXAMPLE IV

PREPARATION OF "DIENE-OL ACETATE"

*1-acetoxy-6-methoxy-4-methylhexadiene-2,4*

In a 50 ml. Claisen flask were placed 10 g. (0.05 mole) of "ene-diol acetate" (1-acetoxy-4-hydroxy-6-methoxy-4-methylhexene-2) and 6.8 g. (0.05 mole) of freshly fused and crushed potassium acid sulfate. The flask was arranged for vacuum distillation, introducing illuminating gas through the capillary tube, and evacuated to 1.0 mm. Heat from an oil bath was then applied gradually over a period of one hour until distillation occurred.

| Fraction | Vapor Temp. | Bath Temp. | Pressure | Weight | $n_D^{20}$ |
|---|---|---|---|---|---|
|  | Degree | Degree | Mm. | G. |  |
| 1 | 74–77.8 | 101–102 | 1.0 | 1.1 | 1.4615 |
| 2 | 77.8–81 | 102–107 | 1.0 | 6.3 | 1.4711 |

The main fraction, 6.3 g. of viscous yellow oil, amounted to a yield of 69% of theoretical.

Neutral equivalent:
  Observed: 18.2; 18.4.
  Calcd.: 184.0.

Analysis:
  Calcd. for $C_{10}H_{16}O_3$: C, 65.2; H, 8.8.
  Found: C, 65.5; H, 8.9.

The structural formula of the product is:

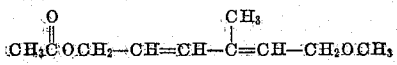

EXAMPLE V

PREPARATION OF "DIENE-OL"

*1-hydoxy-6-methoxy-4-methylhexadiene-2,4*

In a 200 ml. round-bottomed flask fitted with a ground-in condenser holding a calcium chloride tube in the top, were placed 11.6 g. (0.06 mole) of "diene-ol acetate" (1-acetoxy-6-methoxy-4-methylhexadiene-2,4), 2.7 g. (0.05 mole) of sodium methoxide, and 100 ml. (2.47 moles) of absolute methanol. The mixture was refluxed for five hours, during which time it turned brown. By distillation 30 ml. of methanol was then removed.

To the reaction mixture was added 100 ml. of water, 17 ml. of concentrated hydrochloric acid, and 90 ml. of ether. After separation of the ether layer, the aqueous layer was extracted with 140 ml. of ether in small portions.

The combined ether extracts were then washed with 150 ml. of saturated sodium bicarbonate solution. The ether layer was dried over anhydrous calcium sulfate, the ether removed by distillation at atmospheric pressure, and the residue distilled under vacuum, introducing illuminating gas through the capillary tube.

| Fraction | Vapor Temp. | Bath Temp. | Pressure | Weight | $n_D^{20}$ |
|---|---|---|---|---|---|
|  | Degree | Degrees | Mm. | G. |  |
| 1 | 55–72 | 84–94 | 1.0 | 0.3 | 1.4858 |
| 2 | 72–76 | 94–110 | 1.0 | 3.9 | 1.4942 |

Fraction 2 (3.9 g.) represented a yield of 43.6% of theoretical.

Analysis:
  Calcd. for $C_8H_{14}O_2$: C, 67.6; H, 9.9.
  Found: C, 67.2, 67.3; H, 10.0, 10.1.

The structural formula of the product is:

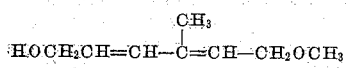

This "diene-ol" product (1-hydroxy-6-methoxy-4-methylhexadiene-2,4) was characterized by forming a solid p-nitrophenyl urethan derivative by reacting 1 mole of the "diene-ol" with 1 mole of para nitrophenylurethane. The derivative was analyzed for $C_{15}H_{18}O_5N_2$ as follows:

|  | Calculated | Observed | |
|---|---|---|---|
| C | 58.82 | 58.84, | 59.17 |
| H | 5.88 | 5.89, | 5.65 |
| N | 9.15 | 9.70, | 9.60 |

The product was obtained as a yellowish oil, B. P. 122–125° C. at 1 to 2 mm.; yield=132.5 g. (42%); $n_D^{20}$=1.4744.

Analysis:
  Calcd. for $C_8H_{14}O_3$: C, 60.7; H, 8.9.
  Found: C, 61.3, 61.2; H, 9.3, 9.1.

The product has the following formula:

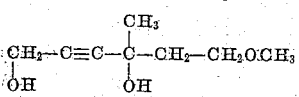

In addition 37 g. (33% of propargyl alcohol) (B. P. 109–111° C.) was recovered from the low boiling fractions.

EXAMPLE VI

PREPARATION OF 1-ACETOXY-4-HYDROXY-6-METHOXY-4-METHYLHEXYNE-2

To a cooled (5–10° C.) solution of 198 g. (1.26 moles) of 6-methoxy-4-methylhexyne-2-diol-1,4 in 300 cc. (3+ moles) of dry pyridine was added in portions over 45 minutes 163 g. (1.6 moles) of acetic anhydride. The solution was allowed to warm up to room temperature and stand overnight.

The desired product was isolated by distillation at reduced pressure; B. P. 110–112° C. at 1 mm.; yield=237 g. (94%); $n_D^{20}$=1.4590. It has the following structural formula:

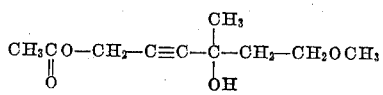

EXAMPLE VII

PREPARATION OF 1-ACETOXY-6-METHOXY-4-METHYLHEXENE-4-YNE-2

A mixture of 109.5 g. (.55 mole) of 1-acetoxy-4-hydroxy-6-methoxy-4-methyl-hexyne-2 and 80 g. (.58 mole) of crushed potassium acid sulfate were placed in a distilling flask. The mixture was heated under reduced pressure until distillate was formed. Keeping the bath temperature as low as possible 73 g. of material (B. P. 96–115° C. at 3 mm.) was collected. This material was fractionated through a one foot helices packed column fitted with a total reflux partial take off head. The desired product was collected at 100–106° C. at 4 mm.; yield=44.5 g. (45%); $n_D^{20}$=1.4773.

Analysis:

Calcd. for $C_{10}H_{14}O_3$: C, 65.9; H, 7.7.
Found: C, 66.1, 65.7; H, 8.0, 8.1.

The product has the following structural formula:

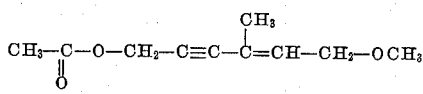

EXAMPLE VIII

PREPARATION OF 1-HYDROXY-6-METHOXY-4-METHYLHEXENE-4-YNE-2

To a solution of 2 g. (.037 mole) of sodium methoxide in 100 cc. of absolute methanol was added 8.5 g. (.047 mole) of 1-acetoxy-6-methoxy-4-methylhexene-4-yne-2. The solution was refluxed for two hours. The methanol was removed under reduced pressure and the organic product isolated after dilution with water by extraction with ether. The product was obtained as a pale yellow oil; B. P. 76–78° C. at 0.5 to 1 mm.; yield=5.0 g. (76%); $n_D^{26}$=1.4903.

Analysis:

Calcd. for $C_8H_{12}O_2$: C, 68.5; H, 8.6.
Found: C, 68.7, 68.7; H, 8.8, 9.0.

The product has the following structural formula:

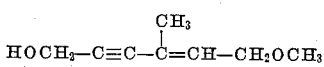

EXAMPLE IX

PREPARATION OF 1-HYDROXY-6-METHOXY-4-METHYLHEXADIENE-2,4

This compound was prepared by reducing 0.7 g. of 1-hydroxy-6-methoxy-4-methylhexene-4-yne-2 under low hydrogen pressure using a palladium-on-charcoal catalyst in absolute alcohol. After one equivalent of hydrogen was taken up, the absorption ceased. The catalyst was removed by filtration, the alcohol solvent removed, and the residue distilled at 65–70° C. under 1 mm. pressure. Yield=0.5 g.

The product was characterized by a solid p-nitrophenyl urethan derivative; M. P. 116–118° C. The product has the following structural formula:

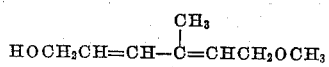

Analysis:

|   | Calcd. | Found |   |
|---|---|---|---|
| C | 58.82 | 58.84 | 59.17 |
| H | 5.88 | 5.89 | 5.65 |
| N | 9.15 | 9.70 | 9.60 |

While the forms of embodiments of the inventions disclosed herein constitute preferred forms, it is to be understood that other forms might be adopted all coming within the scope of the claims which follow:

I claim:

1. The process of synthesizing a vitamin A intermediate consisting of a 1-hydroxy-6-alkoxy-4-methylhexadiene-2,4 which comprises the step of condensing propargyl alcohol with an alkoxy butanone and hydrolyzing; and thereafter the steps of selectively reducing the triple bond of the number two carbon to a double bond, and selectively dehydrating by acylating, dehydrating, and deacylating to remove the hydroxyl group from the number four carbon and to create a double bond adjacent thereto through the unsaturation of said carbon atoms.

2. A process of synthesizing a vitamin A intermediate consisting of a 1-hydroxy-6-alkoxy-4-methylhexadiene-2,4 which comprises the steps in the order specified of condensing propargyl alcohol with an alkoxy butanone and hydrolyzing; selectively dehydrating to remove the hydroxyl group from the number four carbon and to create a double bond adjacent thereto through the unsaturation of the carbon atom by acylating, dehydrating, and deacylating; and selectively reducing the triple bond of the number two carbon to a double bond.

3. In a process of dehydrating a vitamin A intermediate consisting of a 6-alkoxy-4-methyl-hexene-2-diol-1,4 which comprises the steps of selectively acylating to form an acyloxy group on the number one carbon, dehydrating to remove the hydroxyl group from the number four carbon and to create a double bond adjacent thereto through the unsaturation of the number four carbon and replacing the acyl radical by hydrogen in the order specified.

4. A process of synthesizing a vitamin A ether intermediate consistng of a 1-hydroxy-6-alkoxy-4-methylhexadiene-2,4 which comprises the steps in the order specified of mixing a solution of propargyl alcohol and a solution of a metallic reagent selected from the group of metallic reagents consisting of Grignard reagents of the type RMgX and metal alkyls represented by RM wherein each case R represents an alkyl group, Mg represents magnesium, X represents a halogen, and M represents a metal selected from the group of magnesium, lithium, sodium, potassium and calcium, both solutions being in inert anhydrous solvents, and then mixing with an alkoxy butanone; hydrolyzing the product; acetylating to form an acetoxy group on the number one carbon; dehydrating to remove the hydroxyl group from the number four carbon and to create a double bond adjacent thereto through the unsaturation of the carbon atom; and replacing the acetyl group by hydrogen.

5. A process of synthesizing a vitamin A intermediate consisting of a 1-hydroxy-6-alkoxy-4-methylhexadiene-2,4 which comprises the steps in the order specified of mixing a solution of a Grignard reagent in an inert anhydrous solvent with a solution of propargyl alcohol and mixing with an alkoxy butanone; hydrolyzing; and thereafter selectively reducing the triple bond of the number two carbon to a double bond.

6. A process of forming a 1-hydroxy-6-alkoxy-4-methylhexadiene-2,4 from a 6-alkoxy-4-methylhexyne-2-diol-1,4 which comprises the steps in the order specified of dehydrating the hexyne to remove the hydroxyl group from the number four carbon and to convert the compound to a hexene-yne by acylating the number one carbon, dehydrating by the use of potassium acid sulfate and deacylating; and thereafter reducing to convert the hexene-yne to a diene by subjecting the hexene-yne to hydrogen in the presence of a catalyst.

7. A process of forming a 1-hydroxy-6-alkoxy-4-methylhexadiene-2,4 from a 6-alkoxy-4-methylhexyne-2-diol-1,4 which comprises the steps of selectively reducing the triple bond of the number two carbon to a double bond by subjecting the hexyne-diol to the action of hydrogen in the presence of a catalyst and selectively dehydrating by acylating the number one carbon, dehydrating with the use of potassium acid sulfate, and deacrylating to remove the hydroxyl group from the number four carbon and to create a double bond adjacent thereto through the unsaturation of the carbon atom.

8. A process of synthesizing a vitamin A intermediate consisting of a 1-hydroxy-6-alkoxy-4-methylhexadiene-2,4 which comprises the steps in the order specified of mixing a metallic reagent selected from the group of metallic reagents consisting of the Grignard reagents of the type RMgX and metal alkyls represented by RM where in each case R represents an alkyl group, Mg represents magnesium, X represents a halogen and M represents a metal selected from the group consisting of magnesium, lithium, sodium, potassium and calcium, with propargyl alcohol to prepare a propargyl metal derivative and then mixing the propargyl metal derivative with an alkoxy butanone to produce a metal complex addition product; hydrolyzing with ammonium chloride solution; selectively reducing the triple bond of the number two carbon to a double bond by the use of hydrogen and a catalyst; acetylating to form an acetoxy group of the number one carbon with acetic anhydride; dehydrating with potassium acid sulfate to remove the hydroxyl group from the number four carbon and to create a double bond adjacent thereto through the unsaturation of the carbon atom; and replacing the acetyl group by hydrogen with an alkali alcoholate in an alcohol in the order specified.

9. In a process of dehydrating a vitamin A intermediate consisting of a 6-alkoxy-4-methylhexene-2-diol-1,4 which comprises the steps of selectively acrylating to form an acyloxy group on the number one carbon, dehydrating to remove the hydroxyl group from the number four carbon and to create a double bond adjacent thereto through the unsaturation of the number four carbon and replacing the acyl radical by hydrogen in the order specified in which the first process step substitutes an acetoxy group on the number one carbon and the dehydrating of the second step is with potassium acid sulfate.

10. A process of forming a 1-hydroxy-6-alkoxy-4-methylhexadiene-2,4 from a 6-alkoxy-4-methylhexyne-2-diol-1,4 which comprises the steps of selectively reducing the triple bond of the number two carbon to a double bond by subjecting the hexyne-diol to the action of hydrogen in the presence of a catalyst and selectively dehydrating by acylating the number one carbon, dehydrating with the use of potassium acid sulfate, and deacylating to remove the hydroxyl group from the number four carbon and to create a double bond adjacent thereto through the unsaturation of the carbon atom in which the 6-alkoxy-4-methylhexyne-2-diol-1,4 is initially formed by condensing propargyl alcohol with an alkoxy butanone.

11. The process of synthesizing a vitamin A intermediate consisting of a 1-hydroxy-6-alkoxy-4-methylhexadiene-2,4 which comprises the step of condensing propargyl alcohol with an alkoxy butanone and hydrolyzing; and thereafter the steps of selectively reducing the triple bond of the number two carbon to a double bond, and selectively dehydrating by acylating, dehydrating, and deacylating to remove the hydroxyl group from the number four carbon and to create a double bond adjacent thereto through the unsaturation of said carbon atoms in which the alkoxy butanone is 4-methoxy butanone-2.

12. The process of synthesizing a vitamin A intermediate consisting of a 1-hydroxy-6-alkoxy-4-methylhexadiene-2,4 which comprises the step of condensing propargyl alcohol with an alkoxy butanone and hydrolyzing; and thereafter the steps of selectively reducing the triple bond of the number two carbon to a double bond, and selectively dehydrating by acylating, dehydrating, and deacylating to remove the hydroxyl group from the number four carbon and to create a double bond adjacent thereto through the unsaturation of said carbon atoms in which the triple bond of the number two carbon is reduced to a double bond by subjecting it to hydrogen in the presence of a catalyst and the dehydration is accomplished with potassium acid sulfate.

13. A process of synthesizing a vitamin A intermediate consisting of a 1-hydroxy-6-alkoxy-4-methylhexadiene-2,4 which comprises the steps in the order specified of condensing propargyl alcohol with an alkoxy butanone and hydrolyzing; selectively dehydrating to remove the hydroxyl group from the number four carbon and to create a double bond adjacent thereto through the unsaturation of the carbon atom by acylating, dehydrating, and deacylating; and selectively reducing the triple bond of the number two carbon to a double bond in which the deacylating step is accomplished by replacing the acyl group by hydrogen.

14. A process of synthesizing a vitamin A intermediate consisting of a 1-hydroxy-6-alkoxy-4-methylhexadiene-2,4 which comprises the steps in the order specified of condensing propargyl alcohol with an alkoxy butanone and hydrolyzing; selectively dehydrating to remove the hydroxyl group from the number four carbon and to create a double bond adjacent thereto through the unsaturation of the carbon atom by acylating, dehydrating, and deacylating; and selectively reducing the triple bond of the number two carbon to a double bond in which the deacylating step is accomplished by alcoholizing.

MELVIN S. NEWMAN.

REFERENCES CITED

The following references are of record in the file of this patent:

UNITED STATES PATENTS

| Number | Name | Date |
| --- | --- | --- |
| 2,369,156 | Milas | Feb. 13, 1945 |
| 2,455,261 | Milas | Nov. 30, 1948 |

OTHER REFERENCES

Johnson, "The Chemistry of Acetylenic Compounds," Vol. I (1946), pages 18, 122, 126, 187–190, Edward Arnold & Co., London publishers.